United States Patent Office 3,580,808
Patented May 25, 1971

3,580,808
NUCLEAR REACTOR FUEL ELEMENT WITH NONALIGNED CHANNELING
Enar Lofroth, Roslags-Nasby, Sweden, assignor to Aktiebolaget Atomenergi, Stockholm, Sweden
Filed Feb. 26, 1968, Ser. No. 708,308
Int. Cl. G21c 3/30
U.S. Cl. 176—74
1 Claim

ABSTRACT OF THE DISCLOSURE

A known type of a nuclear reactor contains vertical fuel elements in which a vertical channel is provided in the fissile fuel. It has been found that small particles or drops of fissile fuel collects on the bottom of said vertical channel. The inconvenience resulting from said collection of fissile fuel can be reduced if the vertical channel is divided into a plurality of shorter sections.

---

The invention is concerned with a fuel element which is to be mounted in a vertical position in a nuclear reactor. The fuel element is of the known type consisting of a tubular metal can or casing containing a plurality of cylindrical fuel bodies provided with one or more openings or voids extending in the axial direction, for instance one central axial opening. The fuel bodies have their end surfaces facing each other, resulting in the openings forming one or more channels extending lengthwise through the fuel element. The ends of the casing are usually closed, and the channel or channels contain a gas, if desired of a sub-atmospheric pressure. The fuel bodies may consist of a metallic fissile fuel, or of a ceramic fissile fuel such as uranium oxide, $UO_2$. The fuel element of the invention is to be mounted in a vertical position in a nuclear reactor, for instance a water-cooled nuclear reactor.

Fuel bodies of the type described, containing one or more axial channels, involve some advantages over solid fuel bodies, for instance a lower tendency of cracking and a larger cooled surface, based upon a given quantity of fissile fuel. However, when a fuel element of this type is mounted in a vertical position fuel substance collects on the bottom of the axial channel. Said fuel substance may be for instance small fragments of the fissile fuel having loosened from the walls of the axial channel, or it may consist of drops of molten material having flown on the wall of the axial channel. All this substance is fissile, and it will consequently result in an undesired increase of temperature in the bottom of the channel. Said increased temperature may be detrimental to the fuel element, and in particular to the metallic casing.

It has been found, according to this invention that the danger of a harmful temperature increase due to the reasons mentioned above can be eliminated or reduced if the axial channel in the fuel element is divided into a plurality of shorter sections separated by partitions. Each partition constitutes a bottom of such a section. Each partition will receive only a small quantity of the fissile substance mentioned above, and consequently the temperature increase produced by said minor quantity of fissile substance will be negligible. The axial channel should advantageously be divided into at least 10 shorter sections, and preferably into at least 20 shorter sections.

The fuel element of the invention is particularly useful for use in the superheater of a water-cooled nuclear reactor, because the fuel elements for superheating the produced steam operate at a higher temperature than the fuel elements for boiling the water to produce saturated steam.

The partitions may be provided in each fuel body, or between each two adjacent fuel bodies. If the fuel bodies are very short the partitions may be provided in or at each second or each third fuel body, for instance.

Figure 1:
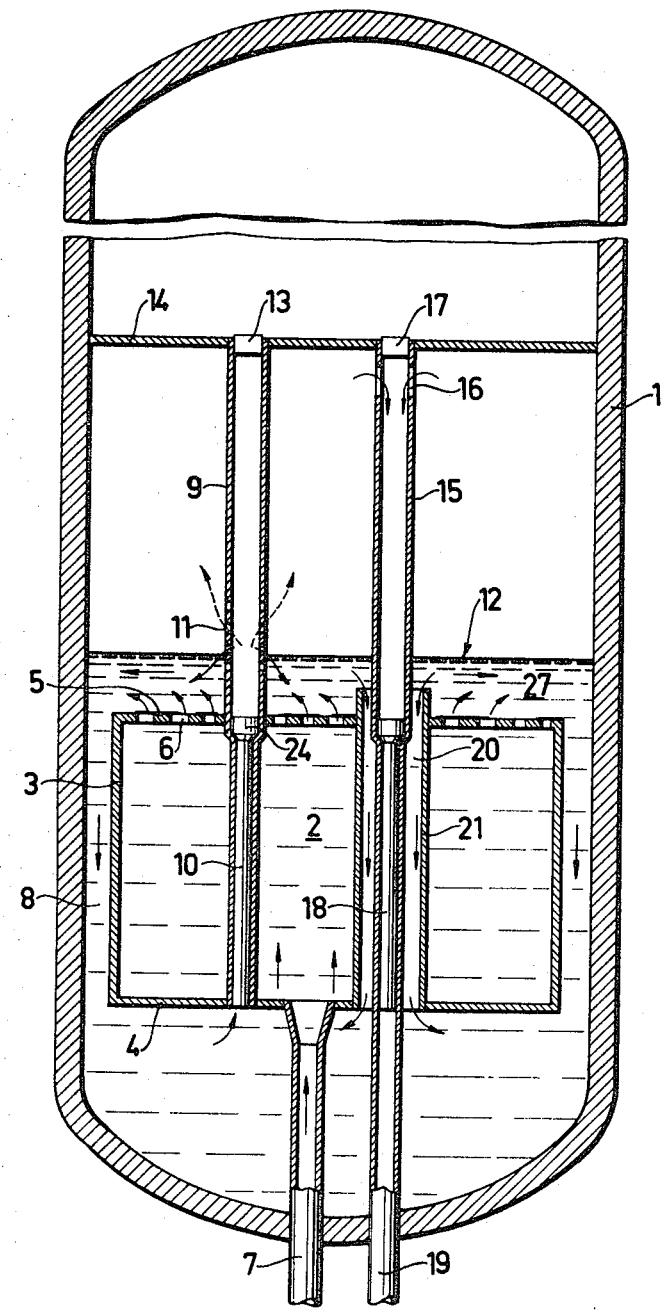
Figure 2:
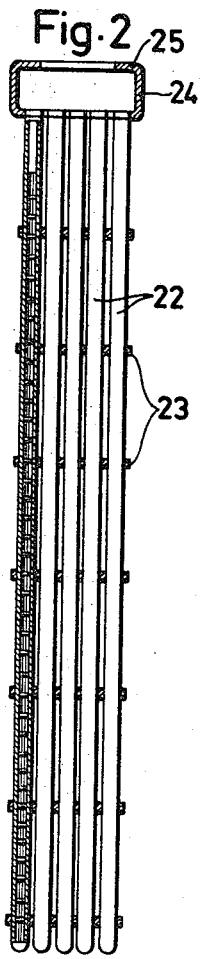

The invention will now be described with reference to the accompanying drawing. FIG. 1 illustrates a nuclear reactor containing fuel elements of the invention. FIG. 2 illustrates a complete fuel cartridge containing fuel element of the invention. FIGS. 3–8 illustrate various embodiments of fuel bodies to be used in the fuel element of the invention. The reaction illustrated in FIG. 1 consists of a cylindrical pressure vessel 1 containing a core 2 for fissile fuel. The core is enclosed in a moderator tank consisting of a cylindrical wall 3, a bottom 4 and a top plate 5 having openings 6. Water is supplied to the bottom of the moderator tank through a tube 7. Said water originates from the condensor of a steam turbine. On its way from the condensor it has passed through one or several preheaters, and enters into the moderator tank at a temperature of 120° C., for instance. The water flows upward through the moderator tank while acting as moderator, and leaves the moderator tank through the openings 6 at a temperature of 220° C., for instance.

The reactor contains a plurality of boiler tubes 9, preferably made of zirconium. For the sake of simplicity only one boiler tube is illustrated in FIG. 1. The lower portion of the tube, extending through the core, contains a fuel cartridge 10 having a head 24 supporting on a shoulder in the boiler tube. Water flows upward through said fuel cartridge while boiling. The mixture of steam and water leaves the boiler tube through openings 11 situated on a level higher than the normal water level 12 in the reactor. The top of the boiler tube is fastened to a partition 14, and is closed by a plug 13.

The reactor also contains a plurality of superheater tubes 15, preferably made of zirconium, only one being illustrated. The portion of the superheater tube extending through the core contains a fuel cartridge 18 having a design similar to that of the fuel cartridge 10. Steam flows downward through said superheater cartridge while being superheated. The superheated steam leaves the reactor through a conduit 19. Saturated steam enters into the superheater tube through openings 16 in its upper portion. The top of the superheater tube is fastened to the partition 14 and is closed by a plug 17.

The superheater tube 15 is situated in a channel 20 defined by an auxiliary tube 21 extending through the core. The upper end of this auxiliary tube extends somewhat above the top 5 of the core, but not as far as the normal water level 12 of the reactor.

The top water layer 27, between the top 5 of the moderator tank and the water level 12, receives water from two directions, namely comparatively cold moderator water from the openings 6 and hot water from the openings 11. The hot water has a tendency of stratifying upon the colder water and therefore hot water will be sucked down into the annular space 20 surrounding the superheater tube. The upper portion of the auxiliary tube 21 will prevent the colder water 27b from entering into said annular space 20. Consequently, the superheater tube 15 will be surrounded by hot water, nearly boiling, preventing steam from condensating on its interior wall.

The remaining quantity of comparatively cold water from the water layer 27 flows down in the space 8 between the moderator tank and the pressure vessel, and is subsequently sucked into the bottom opening of the boiler tubes 9. The boiling in said tubes produces a self-circulation which is normally sufficient for sucking the hot water down into the space 20.

The fuel cartridge 10, 18 is illustrated on a larger scale in FIG. 2. It consists of a plurality of long and comparatively slender fuel elements 22 having their upper ends fastened to a head 24. The head 24 has a flange member 25 by means of which the fuel cartridge can be seized by a refuelling machine, not illustrated, when being placed into or removed from the reactor. Spacing members 23 are provided at equal distances along the length of the fuel cartridge, so as to keep the slender fuel elements 22 at predetermined distances.

Figure 3:
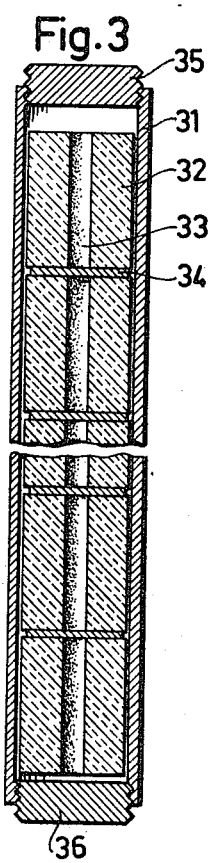

A fuel element 22 is illustrated on a larger scale in FIG. 3. It contains a tubular casing 31 having top and bottom closure plugs 35 and 36. The casing and the closure plugs consist of any known material useful for this purpose, for instance zirconium. The casing contains a plurality of cylindrical fuel bodies 32 consisting of a fissile material such as uranium oxide. The fuel bodies have a central axial opening 33. A thin circular plate 34 is provided between each pair of adjacent fuel bodies. The diameter of the plates 34 is preferably slightly less than that of the fuel bodies. The plates 34 may be applied between the fuel bodies when the fuel bodies are being inserted into the casing 1. It is preferred, however, to fix the plates 34 to the plane end walls of the fuel bodies before the fuel bodies are inserted into the casing. The plates may be fastened by means of an adhesive or in a sintering process. A plate may be applied on one or both plane end walls of the fuel bodies.

Figure 4:
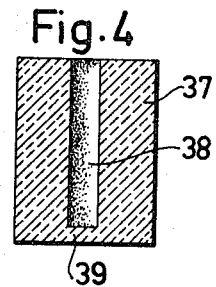

FIG. 4 illustrates a cylindrical fuel body 37 having a central axial opening 38 extending through a part of the height of the fuel body only, thus leaving a thin wall 39 at one of the end walls of the fuel body. When a plurality of fuel bodies 37 are placed in a tubular casing said wall portions 39 will serve as partitions collecting said fissile substance. The fact that the wall 39 consists of fissile material results in a non-uniform temperature in the fuel body, and it is therefore usually preferred to use partitions of a non-fissile material.

Figure 5:
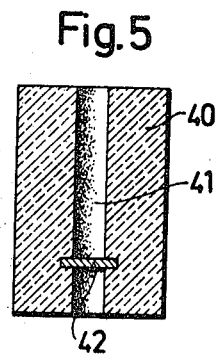

FIG. 5 illustrates a cylindrical fuel body 40 consisting of a ceramic fissile material. The fuel body has a central-axial opening 41 containing a partition 42. The partition consists of a circular plate having its peripheral portion 40 extending into the fissile material. The fuel body is manufactured from pulverulent material such as uranium oxide or uranium carbide which is compressed to form a body. The plate 42 is applied during this compressing operation. The fuel body is now sintered to obtain the desired strength.

In the embodiment of FIG. 3 the fissile substance collecting on the partitions 34 will usually collect in the corner defined by the plate 34 and the wall of the opening 33. This corner will constitute a dangerous zone due to the heat produced by said fissile substance. In order to avoid said dangerous zone the partition 45 illustrated in FIG. 6 has been made as a comparatively thick plate having on its upper surface a circular recessed portion 46 having a slightly larger diameter than the central axial opening 44 of the fuel body 43. Said fissile substance will collect on the bottom of the recessed portion 46.

Figure 6:
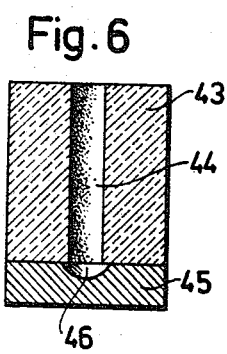

The partition illustrated in FIGS. 3, 5 and 6 may consist of a metal having a low absorption of neutrons, such as zirconium. If the partition consists of a very thin wall it may consist of another material, such as beryllium, molybdenum, tantalum, steel or another metal having a high melting point. Alternatively the partition may consist of graphite, a metal-graphite composition, or a sintered ceramic material such as silicon dioxide, aluminum oxide, silicon carbide. Alternatively, the partition may consist of a material equal or similar to that of the fuel bodies, but containing a lower percentage of the fissile isotopes. For instance, the fuel bodies may consist of enriched uranium, and the partitions of natural uranium. Alternatively, the partition may consist of a compound material such as a metal having a ceramic coating or a ceramic material having a metal coating. It is possible to select the material of the surface layer of the partition so as to adhere to the fissile fuel by sintering during the operation of the fuel element. Alternatively, it is possible to select said surface layer so that no such adherence by sintering occurs.

During the operation of the fuel element of the invention gaseous fission products are produced. The quantity of said gaseous products may be different in different section of the fuel element. In order to equalize the pressure of such gaseous products openings may be provided in the partitions. Said openings should preferably be so narrow that the solid particles referred to above cannot penetrate through the openings.

Figure 8:
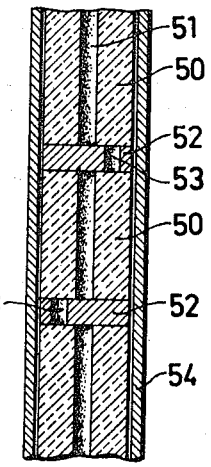
Figure 7:
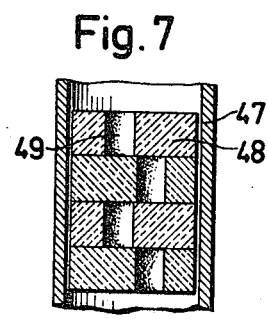

FIGS. 7 and 8 illustrate another way of dividing the channel of a fuel element into sections. As illustrated in FIG. 7 a tubular casing 47 contains a plurality of cylindrical fuel bodies 48 having a low height as compared to their diameter. The fuel bodies contain axial openings 49 having an eccentric position. Each pair of adjacent fuel bodies have such a position that their openings do not communicate. If desired, the fuel bodies may contain a plurality of eccentrically situated axial openings. A smaller number of fuel bodies, for instance five or ten fuel bodies, may be placed so that their openings communicate with each other, whereas the next fuel body is placed in a different position so that the opening or openings of said fuel body does not communicate with the opening or openings of said first mentioned fuel bodies.

As illustrated in FIG. 8 a tubular casing 54 contains a first type of fuel bodies 50 having a comparatively large height and containing a central axial opening 51, and a second type of fuel bodies 52 having a comparatively small height and containing one or more axial openings 53, eccentrically situated so as not to communicate with the openings 51. The fuel bodies 50 may contain enriched uranium, for instance, and the fuel bodies 52 may contain natural uranium.

What I claim is:

1. In a fuel element for a nuclear reactor, comprising a tubular metal casing containing a plurality of stacked cylindrical fuel bodies each of which fuel bodies contains a gas-filled opening extending in the axial direction of the fuel element and constituting a channel through which particles dislodged from said fuel body may fall, the improved construction according to which the channel defined by each said opening has a length no greater than is the axial dimension of the fuel body in which it occurs and is separate from any adjacent channel, whereby the extent of fall of a particle dislodged from a body and falling into the channel opening of that body is restricted to the channel of said body, and in which the channel openings of any two adjacent fuel bodies are displaced relative to each other so as not to communicate with each other, the upper surface of a fuel body being the bottom of a section of the channel of the adjacent overlying fuel body.

References Cited
UNITED STATES PATENTS

| | | | |
|---|---|---|---|
| 2,849,387 | 8/1958 | Brugmann | 176—76 |
| 3,145,149 | 8/1964 | Imhoff | 176—73X |
| 3,146,173 | 8/1964 | Fortescue et al. | 176—37X |
| 3,184,392 | 5/1965 | Blake | 176—73X |
| 3,230,152 | 1/1966 | Kerze, Jr. | 176—76 |
| 3,260,649 | 7/1966 | Jens et al. | 176—76X |
| 3,376,201 | 4/1968 | Bain | 176—73X |

CARL D. QUARFORTH, Primary Examiner

S. HELLMAN, Assistant Examiner

U.S. Cl. X.R.

176—68, 90